(12) United States Patent
Pellacuru et al.

(10) Patent No.: US 7,181,612 B1
(45) Date of Patent: Feb. 20, 2007

(54) FACILITATING IPSEC COMMUNICATIONS THROUGH DEVICES THAT EMPLOY ADDRESS TRANSLATION IN A TELECOMMUNICATIONS NETWORK

(75) Inventors: Chinna N. R. Pellacuru, Santa Clara, CA (US); Adina F. Simu, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 10/052,279

(22) Filed: Jan. 17, 2002

(51) Int. Cl.
*H04L 9/00* (2006.01)

(52) U.S. Cl. .................. 713/153; 713/150; 713/151; 713/152; 370/338; 370/356; 726/15; 709/246; 709/204

(58) Field of Classification Search .............. 726/15; 713/201, 153, 150; 709/246, 204; 707/10; 380/247; 370/338, 356
See application file for complete search history.

(56) References Cited

U.S. PATENT DOCUMENTS

| | | | |
|---|---|---|---|
| 6,330,562 B1 * | 12/2001 | Boden et al. .................. 707/10 |
| 6,687,245 B2 * | 2/2004 | Fangman et al. ........... 370/356 |
| 6,707,915 B1 * | 3/2004 | Jobst et al. .................. 380/247 |
| 6,886,103 B1 * | 4/2005 | Brustoloni et al. ........... 726/15 |
| 6,957,346 B1 * | 10/2005 | Kivinen et al. ............. 713/153 |
| 2002/0046348 A1 * | 4/2002 | Brustoloni .................. 713/201 |
| 2002/0059516 A1 * | 5/2002 | Turtianinen et al. ........ 713/153 |
| 2002/0062344 A1 * | 5/2002 | Ylonen et al. .............. 709/204 |
| 2002/0152325 A1 * | 10/2002 | Elgebaly et al. ............ 709/246 |
| 2003/0031151 A1 * | 2/2003 | Sharma et al. .............. 370/338 |
| 2003/0233576 A1 * | 12/2003 | Maufer et al. .............. 713/201 |

OTHER PUBLICATIONS

Network Computing Security Workshop entitled "Why Can't IPsec and NAT Just Get Along?" by Mike Fratto, dated nov. 27, 2000, (9 pgs), www.networkcomputing.com/1123/1123ws2.html.
"Linux VPN Masquerade HOWTO" by John D. Hardin, dated Oct. 22, 2000, (47 pgs), www.linux.org/HOWTO/VPN-Masquerade-HOWTO.html.
Internet RFC/SRD/FYI/BCP Archives RFC3022 entitled "Traditional IP Network Address Translator (Traditional NAT)", by P. Srisuresh, dated Jan. 2001, (12 pgs), www.faqs.org/rfcs/rfc3022.html.
Internet RFC/STD/FYI/BCP Archives RFC2408 entitled Internet Security Association and Key Management Protocol (ISAKMP), by D. Maughan, et al. dated Nov. 1998, (62 pgs), www.faqs.org/rfcs/rfc2408.html.

* cited by examiner

*Primary Examiner*—Nasseh Moazzami
*Assistant Examiner*—Fikremariam Yalew
(74) *Attorney, Agent, or Firm*—Hickman, Palermo, Truong & Becker LLP

(57) ABSTRACT

A method and apparatus for facilitating Internet Security Protocol (IPsec) communications through devices that employ address translation in a telecommunications network is disclosed. A device that employs address translation, such as a router using Network Address Translation (NAT), receives IPsec based messages from originator nodes in a network and generates a result value for each message based on an initial identifier for each message. The messages are sent to a responder node that generates a response message to each originator node with a subsequent identifier that is based on the corresponding initial identifier. The device matches each response messages to the appropriate originator node within the network based on the result values and the subsequent identifiers. For example, the initial identifiers may be originator Security Parameter Indexes (SPI), and the subsequent identifiers may be responder SPI's that are each based on a hash value of the corresponding originator SPI.

38 Claims, 8 Drawing Sheets

| PROTOCOL AND NODE | INSIDE GLOBAL IP ADDRESS | INSIDE LOCAL IP ADDRESS | OUTSIDE LOCAL IP ADDRESS | OUTSIDE GLOBAL IP ADDRESS |
|---|---|---|---|---|
| IPSEC ORIGINATOR NODE 410 | 171.69.68.10:0 | 10.6.1.2:0xD4560CA1 | 204.71.200.69:0 | 204.71.200.69:0 |
| IPSEC ORIGINATOR NODE 420 | 171.69.68.10:0 | 10.6.1.3:0xB7285662 | 204.71.200.69:0 | 204.71.200.69:0 |

FIG. 5A

| PROTOCOL AND NODE | INSIDE GLOBAL IP ADDRESS | INSIDE LOCAL IP ADDRESS | OUTSIDE LOCAL IP ADDRESS | OUTSIDE GLOBAL IP ADDRESS |
|---|---|---|---|---|
| IPSEC ORIGINATOR NODE 410 | 171.69.68.10:0 | 10.6.1.2:0xD4560CA1 | 204.71.200.69:0 | 204.71.200.69:0 |
| IPSEC ORIGINATOR NODE 410 | 171.69.68.10:0 | 10.6.1.2:0 | 204.71.200.69:0 | 204.71.200.69:0xB3511368 |
| IPSEC ORIGINATOR NODE 420 | 171.69.68.10:0 | 10.6.1.3:0xB7285662 | 204.71.200.69:0 | 204.71.200.69:0 |
| IPSEC ORIGINATOR NODE 420 | 171.69.68.10:0 | 10.6.1.3:0 | 204.71.200.69:0 | 204.71.200.69:0xC3ADA079 |

FIG. 5B

FACILITATING IPSEC COMMUNICATIONS THROUGH DEVICES THAT EMPLOY ADDRESS TRANSLATION IN A TELECOMMUNICATIONS NETWORK

FIELD OF THE INVENTION

The present invention relates generally to securing communications in a network, and more specifically, to facilitating communications through devices that employ address translation in a telecommunications network.

BACKGROUND OF THE INVENTION

The techniques described in this section are techniques that could be pursued, but not necessarily techniques that have been previously conceived or pursued. Therefore, unless otherwise indicated, it should not be assumed that any of the techniques described in this section qualify as prior art merely by virtue of their inclusion in this section.

Some telecommunications networks employ a form of address translation known as Network Address Translation (NAT) at devices that serve as the gateway between the networks and the Internet. There are two primary implementations of NAT. The first implementation, dynamic address NAT, assigns a temporary global IP address to local IP addresses for nodes within the network separated from the Internet by the NAT device. Generally, for the nodes within the network, a different temporary global IP address is used for each node. With dynamic address NAT, addresses are only used for a connection as long as the connection is alive. When the connection is terminated the addresses are available for use in subsequent connections. Note that global IP addresses may be referred to as external or public IP addresses, and local IP addresses may be referred to as internal or private IP addresses.

The second implementation, Network Address Port Translation (NAPT), allows a network to essentially hide behind a single public, or global, IP address. While each node within a network using NAT at the gateway separating the network and the Internet has a unique local IP address, traffic exiting the network through the gateway uses the global IP address. A translation table is used by the gateway to associate the local addresses with the global address.

The term "NAT" will be used herein to refer to network address translation that encompasses both dynamic address NAT and NAPT.

When a network uses NAT, the traffic that passes out of the network through gateway to the Internet does not include the true local IP address of the nodes within the network. When traffic directed to the nodes within the network is received from outside of the network by the gateway, the traffic is addressed to the global address assigned by the gateway device. When out of network traffic is received, the gateway device uses the translation table to look up which local address corresponds to the global address of the incoming traffic to the properly direct the traffic within the network. For example, some Internet service providers (ISPs) use a NAT device as a gateway between the ISP's network and the Internet. Use of NAT is common among ISP's providing Digital Subscriber Line (DSL) and cable access that have numerous customers within the ISP's networks.

Some telecommunications networks secure traffic over networks through the use of the Internet Protocol Security (IPsec or IPSec), which may be used with a virtual private network (VPN). IPsec uses security associations (SA's) that specify the parameters for the IPsec secured traffic, and IPsec operates in one of two modes, transport mode or tunnel mode, using one of two protocols, Encapsulating Security Payload (ESP) or Authentication Header (AH). A transport mode security association is an SA between two hosts. A transport mode security protocol header (either ESP or AH) appears immediately after the IP header and before any higher layer protocols (e.g., transmission control protocol (TCP) or user datagram protocol (UDP)). A tunnel mode security association is an SA that is applied to an IP tunnel. Whenever either end of a security association is a security gateway, the SA is a tunnel mode SA. For a tunnel mode SA, there is an "outer" IP header that specifies the IPsec processing destination, and there is an "inner" IP header that specifies the "apparent" ultimate destination for the packet. The ultimate destination may be "apparent" and not the actual ultimate destination, such as due to the use of NAT device.

Furthermore, there are two protocols used with IPsec. For both transport and tunnel mode, the Encapsulating Security Payload (ESP) protocol secures data that follows the ESP header, and thus ESP does not secure the IP header that is before the ESP header. For both transport and tunnel mode, the Authentication Header (AH) secures both data that follows the AH header and the IP header that is before the AH header.

IPsec uses Security Parameter Index (SPI) values to identify the security association (SA) used for the secured traffic between two nodes, such as over a VPN. The SA defines the encryption protocols, keys, and other parameters relating to the IPsec secured traffic. Conventionally, the SPI for each node communicating via IPsec is a randomly generated value having a length of four bytes. As used herein, the node initiating an IPsec based communication is referred to as the "IPsec originator node," and the node responding to the communication is referred to as the "IPsec responder node."

The SPI for each node is determined during the second phase of the Internet Key Exchange (IKE) portion of the IPsec protocol as the SA is negotiated between the IPsec originator node and the IPsec responder node. Because the SA negotiation is encrypted, the NAT device does not know the SPI's for each node.

A problem arises when IPsec secured traffic passes through a device that employs NAT because with some IPsec modes and protocols, the change in the IP addresses by the NAT device causes the IPsec security checks to fail. For example, the AH protocol uses the IP address to ensure the authenticity (e.g., origin) of the traffic by encapsulating the IP address, so that changing the IP address for traffic passing through the NAT device will lead to a security violation. As another example, transport mode also protects the IP address, so that a change in the IP address by the NAT device will also lead to a security violation.

IPsec traffic using the ESP protocol, either in transport mode or in tunnel mode, will not have the IP headers protected, and therefore security violations do not occur as a result of the NAT device changing the IP address. However, a problem arises with IPsec using the ESP protocol in tunnel mode when more than one node within the network protected by the gateway employing NAT wants to use IPsec with the same outside node. The problem is of particular concern if the gateway employs NAPT that which uses the same inside global IP address for all of the local nodes inside the network.

FIG. 1 depicts a logical block diagram 100 with two IPsec originator nodes within a network separated from the Internet by a NAT device, where the two IPsec originators both attempt to establish IPsec based communications with the same IPsec responder node. In FIG. 1, IPsec originator nodes 110, 120 are communicatively coupled to ISP network 130, which in turn is communicatively coupled to Internet 150 via an ISP NAT device 140. An IPsec responder node 160 is communicatively coupled to Internet 150.

Assume that ISP NAT device 140 employs NAPT in which a common global IP address is used for all nodes within ISP network 130. When IPsec originator node 110 sends IPsec traffic to IPsec responder node 160, ISP NAT device 140 replaces the local IP address for IPsec originator node 110 with a global IP address for ISP network 130. When IPsec responder node 160 receives the IPsec traffic from IPsec originator node 110, IPsec responder node 160 only knows the global address for ISP network 130, and the response sent by IPsec responder node 160 to IPsec originator node 110 will be sent to the global IP address for ISP network 130. When the traffic from IPsec responder node 160 is received by ISP NAT device 140, ISP NAT device 140 does not know whether to send the IPsec traffic to IPsec originator node 110 or IPsec originator node 120 because the traffic is address to the global address for ISP network 130.

However, ISP NAT device 140 conventionally is configured with a default approach for handling this type of situation. Assume for this example that ISP NAT device 140 is configured to forward the incoming IPsec traffic to the IPsec originator node that most recently sent IPsec traffic from ISP network 130.

The problem arises when IPsec originator node 120 also wants to initiate an IPsec secured connection with IPsec responder node 160 before the connection between IPsec originator node 110 and IPsec responder node 160 is established. In this situation, both IPsec originator node 110 and IPsec originator node 120 have initiated IPsec connections with IPsec responder node 160. Assume for this example that IPsec originator node 110 sent the first request to IPsec responder node 160, followed shortly thereafter by IPsec originator node 120.

When IPsec responder node 160 replies to the first request received from IPsec originator nodes 110, 120, ISP NAT device 140 follows the default approach and forwards the incoming IPsec traffic to the last IPsec originator node that sent IPsec traffic from ISP network 130. Assume for this example that the first request received by IPsec responder node 160 is from IPsec originator node 110. However, as assumed above, the last IPsec traffic passing out of the ISP's system was from IPsec originator node 120. Therefore, by following the conventional default approach, ISP NAT device 140 will forward the IPsec traffic to IPsec originator node 120, which is incorrect.

Even if other default approaches for forwarding IPsec traffic are used by ISP NAT device 140, such as forwarding the incoming IPsec traffic to the node that first sent out IPsec traffic, there will be times when the default approach results in forwarding the IPsec traffic to the wrong IPsec originator node. For example, even under this altered default approach, the order that the IPsec originators send traffic through ISP NAT device 140 does not guarantee that responses from IPsec responder node will be received in the same order due to variations in response times by IPsec responder node 160 and transmission times through Internet 150.

One approach for solving this problem is to prevent more than one originator node from trying to establish an IPsec connection with a particular IPsec responder node at the same time. For example, if IPsec originator node 110 sends IPsec traffic to IPsec responder node 160, IPsec originator node 120 is prevented by ISP NAT device 140 from sending an IPsec based request to IPsec responder node 160 until either the IPsec based connection between IPsec originator node 110 and IPsec responder node 160 is established or the attempt to establish the IPsec based connection is timed out. Once the IPsec based connection is established, ISP NAT device 140 can associate the SPI used by IPsec originator node 110 with the SPI used by IPsec responder node 160 for the IPsec based connection to ensure that incoming IPsec traffic is directed to the proper IPsec originator node. After the connection between IPsec originator node 110 and IPsec responder node 160 is established, ISP NAT device 140 allows IPsec originator node 120 to send IPsec traffic to IPsec responder node 160. This approach may be referred to as "serialization."

There are several drawbacks to serialization, such as the delay associated with IPsec originator nodes having to wait to for other IPsec originator nodes to first establish IPsec connections. The wait can be significant if there are many IPsec originator nodes trying to connect to the same IPsec responder node. Furthermore, IPsec connections use timeouts and require a new SA to be established upon expiration of a timeout. The shorter the timeout, the more often the IPsec connections need to be re-established, increasing the chances that two or more IPsec originator nodes will be trying to establish an IPsec connection at the same time.

Another approach for handling multiple IPsec communications through a NAT device is to pass the IPsec traffic through the NAT device using transmission control protocol/user datagram protocol (TCP/UDP) encapsulation of the IPsec ESP packets. Because the NAT device only alters the IP addresses in the outer TCP/UDP encapsulation headers, the IPsec headers remain unchanged. However, the extra TCP/UDP encapsulation results in additional overhead, sometimes of up to 28 bytes.

Further, the Internet Key Exchange (IKE) part of the IPsec protocol needs to detect the presence of the NAT device to know when the TCP/UDP encapsulation is needed, otherwise the extra overhead is incurred even when a NAT device is not present to cause a problem. Also, "keepalives" need to be used to keep the NAT translation active because the UDP encapsulation often involves aggressive timeouts on the order of a few minutes, and while keepalives are not needed for TCP encapsulation, undesirable retransmissions may occur.

Yet another approach is to use Realm Specific IP (RSIP) so that the IPsec originator nodes can communicate with the NAT device to perform the address translation. While this precludes the need to change the IKE protocol of IPsec, the IPsec processing must be altered to be compatible with the RSIP approach, which would involve changes to both the IPsec originator node and the NAT device. While a network owner, such as an ISP, may be able to absorb the expense of modifying the NAT devices, making alterations to the IPsec originator nodes that are typically owned by the ISP's customers is often not practical.

Based on the foregoing, it is desirable to provide improved techniques for facilitating IPsec communications through devices that employ address translation in a telecommunications network.

SUMMARY OF THE INVENTION

Techniques are provided for facilitating Internet Security Protocol (IPsec) communications through devices that employ address translation in a telecommunications network. According to one aspect, an electronic message is received from a first node, with the electronic message based on IPsec and associated with a first identifier. A value is generated based on the identifier, and the electronic message is sent to a second node. A second electronic message based on IPsec is received from the second node, with the second electronic message based on a second identifier that is generated based on the first identifier. Based on the identifiers, a determination is made whether the second electronic message is directed to the first node, and if so, the second electronic message is sent to the first node.

According to other aspects, the identifiers are IPsec Security Parameter Indexes (SPI's) used by an IPsec originator node and an IPsec responder node. The IPsec originator node sends an IPsec based message from a network through a device that employs Network Address Translation (NAT) to hide the internal network IP addresses. The NAT device determines a hash value based on the originator SPI and stores the hash value. When the IPsec responder node receives the message from the IPsec originator node, the IPsec responder node uses the responder SPI that is based at least in part on a hash of the originator SPI. When the NAT device receives an IPsec based response message from the IPsec responder node, the NAT device compares the portion of the responder SPI that is based on the hash of the originator SPI to the stored hash values to determine to which IPsec originator node to direct the IPsec based response message.

As a result of matching the initial identifiers, such as originator SPI's, to the subsequent identifiers, such as the responder SPI's, the device employing address translation can determine to which IPsec originator node each IPsec based response message is directed, thereby allowing the device to facilitate establishing multiple IPsec communications between originator nodes and a responder node at the same time.

In other aspects, the invention encompasses a computer apparatus, a computer readable medium, and a carrier wave configured to carry out the foregoing steps.

BRIEF DESCRIPTION OF THE DRAWINGS

The present invention is depicted by way of example, and not by way of limitation, in the figures of the accompanying drawings and in which like reference numerals refer to similar elements and in which:

FIG. 5A and FIG. 5B depict a translation table for the ISP NAT device with inside global IP addresses, inside local IP addresses, outside local IP addresses, and outside global IP addresses for the IPsec originator nodes.

DETAILED DESCRIPTION OF THE INVENTION

A method and apparatus for facilitating IPsec communications through devices that employ address translation in a telecommunications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the embodiments are discussed under topic headings that appear in the following order:
I. FUNCTIONAL OVERVIEW
II. GENERATING SUBSEQUENT IDENTIFIERS BASED ON INITIAL IDENTIFIERS
  A. Approaches for Generating Result Values Based on Initial Identifiers
  B. Generating a Subsequent Identifier Based on a Result Value
  C. Clients and Servers as IPsec Originator and Responder Nodes
III. MATCHING IDENTIFIERS FOR IPSEC TRAFFIC THROUGH A DEVICE EMPLOYING ADDRESS TRANSLATION
  A. Comparing Initial and Subsequent Identifiers
  B. Handling Multiple IPsec Messages
IV. IMPLEMENTATION FEATURES AND OTHER CONSIDERATIONS
  A. When and Where to Generate Result Values
  B. Storing Identifiers and Result Values
  C. Storing Matching Identifiers
  D. Collisions vs. Random Bytes of the Subsequent Identifier
VI. HARDWARE OVERVIEW
VII. EXTENSIONS AND ALTERNATIVES I. Functional Overview Techniques are provided for facilitating IPsec communications through devices that employ address translation in a telecommunications network. According to one embodiment, an identifier for a first IPsec based message is associated with an identifier for a second IPsec based message such that a device employing address translation is able to match incoming IPsec traffic with previous outgoing IPsec traffic based on the two identifiers.

For convenience, the following examples are described using a network address translation (NAT) enabled device that separates an Internet service provider (ISP) from the Internet. However, embodiments and implementations may use other forms of address translation on any device that is between two network nodes using IPsec any electronic message protocol that suffers from the disadvantages identified herein.

Figure 2A:
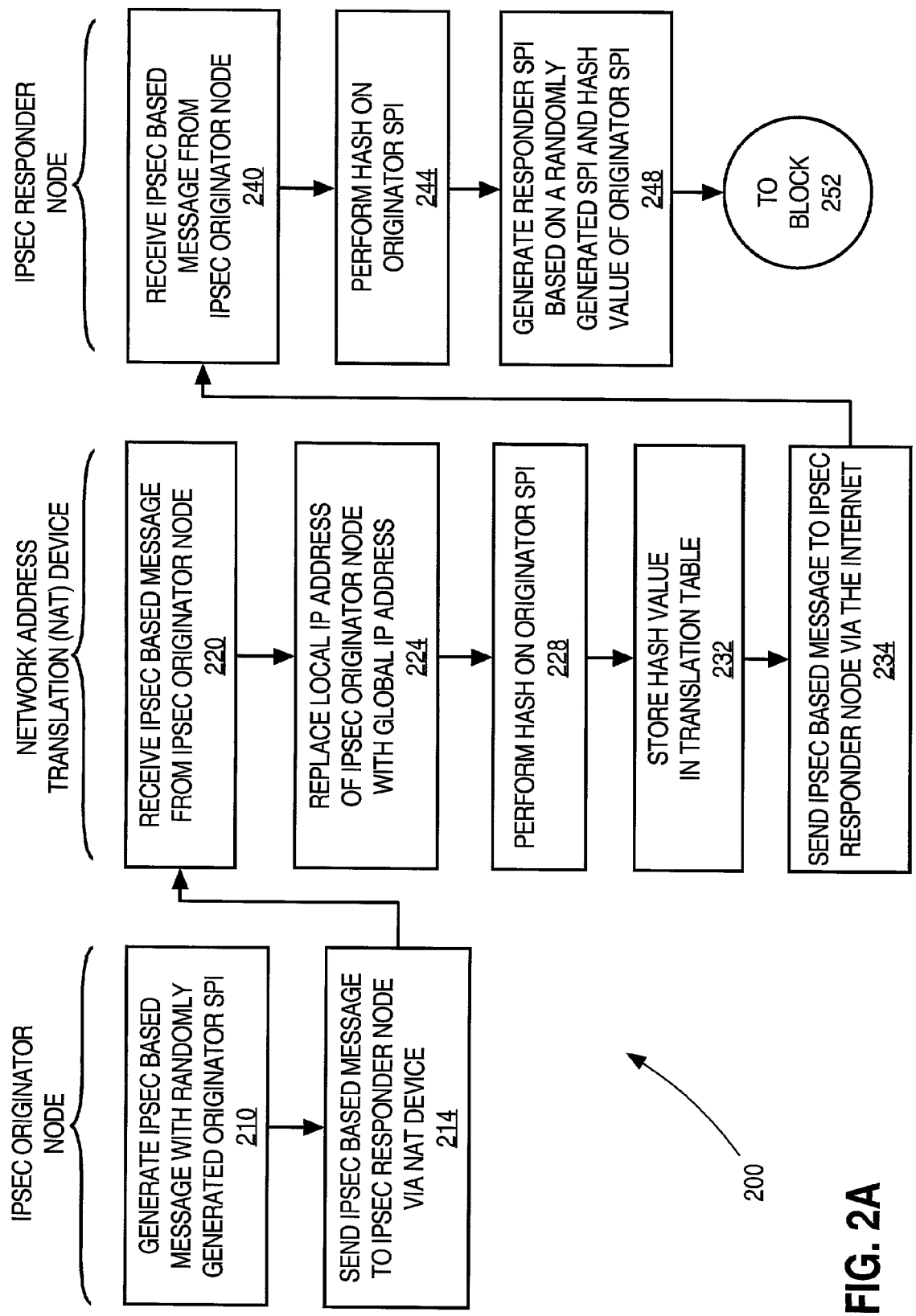
FIG. 2A and FIG. 2B depict a flow diagram of an overview of an approach for facilitating IPsec communications through a device that employs address translation in a telecommunications network, according to an embodiment.
Figure 2B:
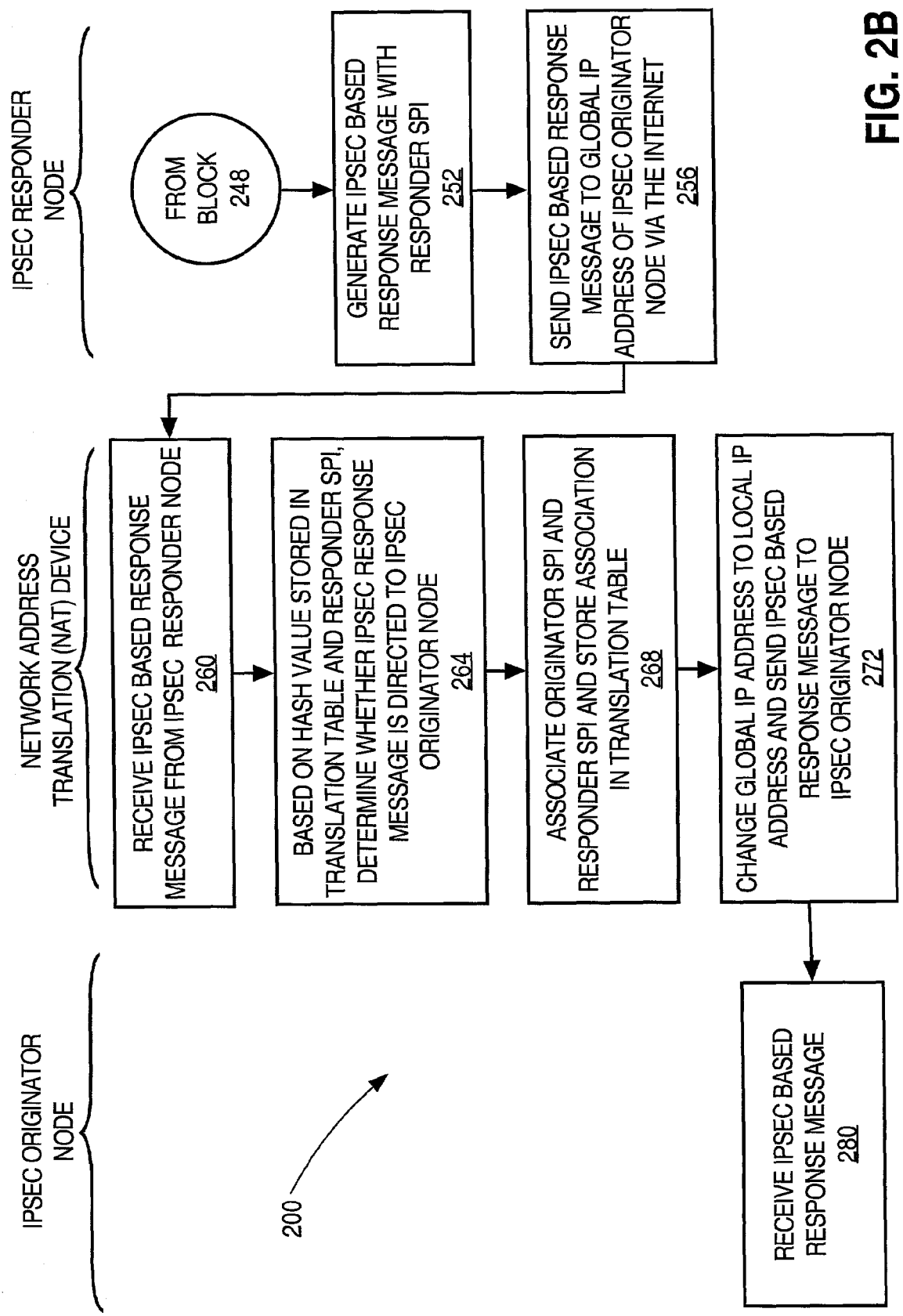

FIG. 2A and FIG. 2B depict a flow diagram 200 of an overview of an approach for facilitating IPsec communications through a device that employs address translation in a telecommunications network, according to an embodiment.

Figure 1:
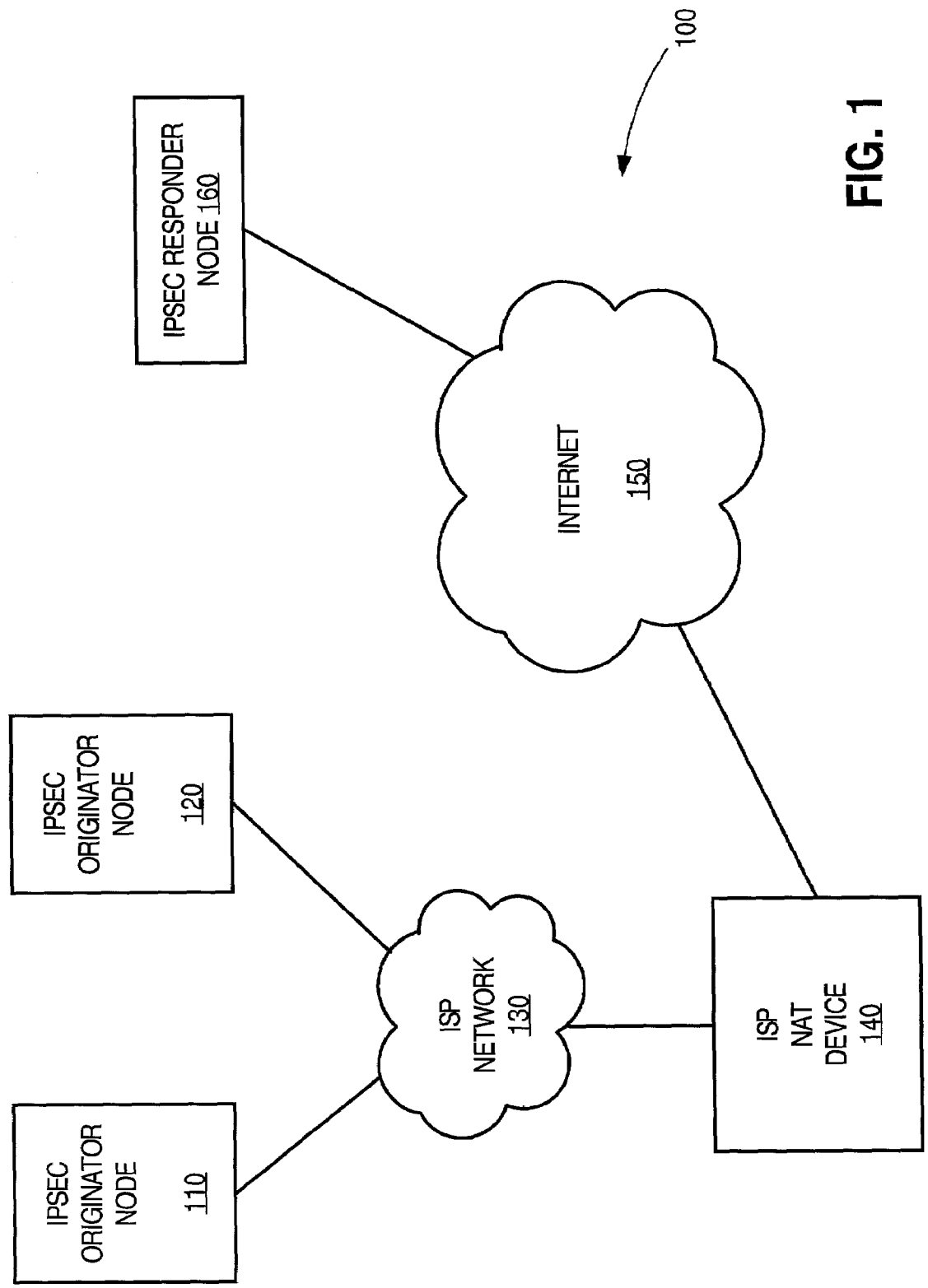
FIG. 1 depicts a logical block diagram with two IPsec originator nodes within a network separated from the Internet by a NAT device, where the two IPsec originators both attempt to establish a IPsec based communications with the same IPsec responder node.

FIG. 2A and FIG. 2B are described with reference to the elements of FIG. 1, although the approach of FIG. 2A and FIG. 2B is not limited to the particular elements or the arrangement of the elements of FIG. 1. Furthermore, other embodiments may include fewer or additional steps than those depicted in FIG. 2A and FIG. 2B, a different ordering for the steps, and a different allocation of which entity among the nodes and devices of FIG. 1, as well as other entities, perform the steps of FIG. 2A and FIG. 2B.

In block 210, an IPsec originator node, such as IPsec originator nodes 110, 120, generates an IPsec based message with a randomly generated SPI, herein referred to as the "originator SPI." The use of a randomly generated four-byte SPI is typical for IPsec implementations, although other approaches for generating the SPI and other SPI sizes may be used. More generally, any identifier may be used, not just a SPI that is part of the IPsec protocol. Also, the SPI may be generated using a pseudo-random number generator.

In block 214, the IPsec originator node sends the IPsec based message to an IPsec responder node, such as IPsec responder node 160, via a NAT device, such as ISP NAT device 140. In block 220, the NAT device receives the IPsec based message from the IPsec originator node. The IPsec originator node may be part of a network, such as ISP network 130 that employs ISP NAT device 140 as a gateway between ISP network 130 and Internet 150.

In block 224, the NAT device replaces the local IP address of the IPsec originator node with a global IP address. For example, the NAT device may employ NAPT that uses a common inside global IP address for the IPsec originator nodes in the network behind the NAT device.

In block 228, the NAT device performs a hash on the originator SPI. For example, the NAT device may be configured to use the Message Digest 5 (MD5) one-way hash function to generate a hash value. If the originator SPI is four bytes in length, the MD5 hash value will be sixteen bytes in length. Other hash functions or schemes that produce a fixed length result or, more generally, any approach for generating a result value based on an input value may be used.

In block 232, the NAT device stores the hash value in a translation table. Because the NAT device performs IP address changes, the NAT device typically uses a translation table to associate, or map, the local IP addresses to the global IP addresses. The hash value for an IPsec message from a particular IPsec originator node may also be stored in the translation table. More generally, any approach for mapping a pair of values may be used to associate result value with the initial identifier.

In block 234, the NAT device sends the IPsec based message that was received from the IPsec originator node to the IPsec responder node via the Internet.

In block 240, the IPsec responder node receives the IPsec based message that originated with the IPsec originator node and that passed through the IPsec NAT device.

In block 244, the IPsec responder node performs a hash on the originator SPI of the IPsec based message from the IPsec originator node. As with the NAT device, the hash may be based on MD5, another hash function, or any approach for producing a result value based on an input value. However, whichever approach, scheme, or hash function is used, both the NAT device in block 228 and the IPsec responder node in block 244 use the same approach, scheme, or hash function with the originator SPI to obtain the same result value. Note that for explanation purposes, FIG. 2A shows the IPsec responder node performing the hash on the originator SPI after receiving the IPsec based message from the IPsec originator node in block 240. However, according to another embodiment, the IPsec responder node performs the hash on the originator SPI as part of the SPI negotiation during IKE phase 2, which occurs as the IPsec originator node and IPsec responder node negotiate the SA prior to exchanging IPsec secured traffic. Thus, in this embodiment, the function of block 244 is performed prior to the generation of the IPsec based message in block 210.

In block 248, the IPsec responder node generates a responder SPI based on a randomly generated SPI and the hash value of the originator SPI. For example, the responder SPI, which is typically four bytes, may use the first two bytes of the hash value as the last two bytes of the responder SPI. Thus, the first two bytes of the responder SPI are the first two bytes of the randomly generated SPI, and the last two bytes of the responder SPI are the first two bytes of the hash value for the originator SPI. Note that for explanation purposes, FIG. 2A shows the IPsec responder node generating the responder SPI after receiving the IPsec based message from the IPsec originator node in block 240. However, according to another embodiment, the IPsec responder node generates the responder SPI as part of the SPI negotiation during IKE phase 2, which occurs as the IPsec originator node and IPsec responder node negotiate the SA prior to exchanging IPsec secured traffic. Thus, in this embodiment, the function of blocks 244 and 248 are performed prior to the generation of the IPsec based message in block 210.

Other approaches for generating the responder SPI may be used. For example, the responder SPI may be the first four bytes of the hash value of the originator SPI, thus precluding the need for a typical randomly generated SPI value. As another example, the responder SPI may use the randomly generated SPI except that the second byte of the responder SPI may be replaced with ninth byte of the hash value.

In block 252, the IPsec responder node generates an IPsec based response message with the responder SPI generated in block 248. In block 256, the IPsec responder node sends the IPsec based response message to the global IP address of the IPsec originator node via the Internet. In block 260, the NAT device receives the IPsec based response message from the IPsec responder node.

In block 264, the NAT device determines whether the IPsec response message is directed to the IPsec originator node based on the hash value that was stored in the translation table in block 232 and the responder SPI of the IPsec based response message. The NAT device does not know which of the possible nodes within the network for which the NAT device serves as a gateway is the recipient of the IPsec based response message because the response message is addressed to the global IP address of the network. This problem is acute when two or more IPsec originator nodes within the network are expecting IPsec based response messages from the IPsec responder node because the IPsec based response messages will be addressed to the same global IP address used by the NAT device.

However, by using the hash values that are stored in the translation table when outgoing IPsec traffic was sent and comparing those hash values to the responder SPI, the NAT device can determine to which IPsec originator node to send the IPsec based response message. For example, if the IPsec responder node generated the responder SPI by using the first two bytes of an MD5 hash of the originator SPI as the last two bytes of the responder SPI, the NAT device can compare the last two bytes of the responder SPI to the hash values stored in the translation table. If a match is found to the hash value stored in the translation table in block 232, the NAT device knows that the IPsec based response message is directed to the IPsec originator node that used the originator SPI that was input to the MD5 hash function in block 228.

Assume, for the following discussion of blocks 268, et seq., that the NAT device did determine that the IPsec based response message from IPsec responder node is directed to IPsec originator node that generated and sent the IPsec based message in blocks 210 and 214. However, it is possible that the IPsec based response message is not determined to be directed to the IPsec originator node described with reference to blocks 210 and 214. For example, the IPsec based response message may be directed to another IPsec originator node in the same network as the IPsec originator node that generated and sent the IPsec based message in blocks 210 and 214, in which case the IPsec based response message is sent to the appropriate IPsec originator node.

In block 268, the NAT device associates the originator SPI and the responder SPI and stores the association in the translation table. For example, entries in the translation table may be used to store the originator SPI and the responder SPI as a pair, or existing entries in the translation table for the communications between the IPsec originator node and the IPsec responder node may be modified to append the appropriate SPI's to the addresses of the corresponding nodes.

In block 272, the NAT device changes the global IP address to which the IPsec based response message is addressed to the local IP address of the IPsec originator node based on the translation table information. Then the NAT device sends the IPsec based response message to the IPsec originator node at the local IP address.

In block 280, the IPsec originator node receives the IPsec based response message that was sent by the IPsec responder node in block 256.

The use of the same hash function, specified scheme, or other approach based on the originator SPI by both the NAT device in block 228 and the IPsec responder node in block 244 allows the NAT device to match incoming responder SPI's to the proper outgoing originator SPI. As a result, when two or more IPsec originator nodes are establishing IPsec based communications with the same IPsec responder node, the NAT device can determine to which IPsec originator node any incoming IPsec traffic is to be directed. This approach precludes the need to encapsulate the IPsec traffic in an attempt to bypass the NAT device or to use serialization to allow one IPsec originator node at a time to try to establish IPsec based communications with the same IPsec responder node.

II. Generating Subsequent Identifiers Based on Initial Identifers

As used herein, the term "initial identifier" is used to refer to an identifier of a first electronic message, whereas the term "subsequent identifier" is used to refer to an identifier of a second electronic message that is based on the first electronic message. For example, as discussed above with reference to FIG. 2A and FIG. 2B, the originator SPI is an example of an initial identifier, and the responder SPI is an example of a subsequent identifier. The IPsec based response message of FIG. 2A and FIG. 2B is an example of a second electronic message that is based on an initial electronic message because the IPsec based response message is sent in response to the IPsec based message sent by the IPsec originator node.

A. Approaches for Generating Result Values Based on Initial Identifiers

According to one embodiment, a specified scheme is used to generate a result based on an initial identifier. For example, the specified scheme may be the MD5 one-way hash function and the initial identifier is a randomly generated SPI. By applying MD5 to the randomly generated SPI, a hash value, or hash result, is produced. For example, with a four byte SPI, MD5 produces a sixteen byte hash.

However, other schemes may be used to generate a result value based on a particular input value. For example, the specified scheme may be to add the value "1" to the input value to produce the result value, or the specified scheme may be to reverse the bytes of the input value to produce the result value. As other examples, different hash algorithms may be used, which may be advantageous because the result value has a known, fixed length, whereas with other approaches, the size of the result value may vary depending on the input value.

According to another embodiment, whatever specified scheme or approach is selected for use with the initial identifier, the selected approach is used by both the device employing address translation and the node from which a response message is sent based on an initial message. For example, in FIG. 2A and FIG. 2B, both the NAT device and the IPsec responder node use the same hash function in blocks 228 and 244. Because the same approach is used by both the NAT device and the IPsec responder node, the NAT device is able to compare the responder SPI to the hash value based on the originator SPI to determine to which IPsec originator node incoming IPsec traffic is directed from the IPsec responder node.

The approach used with the initial identifier to generate the result may be determined by a variety of approaches. For example, the NAT device and the IPsec responder can be manufactured or configured upon installation to use a specified approach. As another example, any device, user, or other entity may specify the approach and inform or configure, either manually or via an electronic message, the device employing address translation and the node from which the response message is sent of the selected approach. As yet another example, the selection of the approach may be part of the operating system used by the address translation device and the responding node. An example of such an operating system is the Internetworking Operating System (IOS) of Cisco Systems, Inc.

B. Generating a Subsequent Identifier Based on a Result Value

According to one embodiment, a subsequent identifier is generated based on the result value of an approach that uses an initial identifier as input. For example, if the initial identifier is an originator SPI that has four bytes and the specified scheme is MD5, then the MD5 has value is a sixteen byte result, any or all of which may be used to create the responder SPI. For example, to create a four byte responder SPI, any four bytes of the MD5 hash value may be used, including but not limited to, the first four or last four bytes of the hash value. As another example, the first two bytes of the hash value may be used as the last two bytes of the responder SPI, with the first two bytes of the responder SPI being the first two bytes of a conventionally generated SPI.

According to another embodiment, whatever approach is selected to generate the subsequent identifier, the selected approach is used by both the node from which a response message is sent based on an initial message and the device employing address translation such that the latter can analyze the subsequent identifier generated by the former. In general, any approach may be used to generate the subsequent identifier based on the specified scheme that uses the initial identifier as long as the selected approach is known to both the node from which a response message is sent based on an initial message and the device employing address translation.

The approach used to generate the subsequent identifier may be determined by a variety of approaches. For example, the NAT device and the IPsec responder can be manufactured or configured upon installation to use a specified approach. As another example, any device, user, or other entity may specify the approach and inform or configure, either manually or via an electronic message, the device employing address translation and the node from which the response message is sent of the selected approach. As yet another example, the selection of the approach may be part of the operating system used by the address translation device and the responding node.

The particular approach for generating the subsequent identifier depends on several considerations, as discussed more fully below in the subsection entitled "Collisions vs. Random Bytes of the Subsequent Identifier." A "collision" occurs when the device employing address translation cannot distinguish between two originator nodes when trying to determine to which originator node IPsec traffic is directed. Generally, the larger the portion of the subsequent identifier that is based on the result from the specified scheme, the less likely collisions are to occur, yet the portion of the subsequent identifier that can be generated or specified by other means for other uses is smaller.

C. Clients and Servers as IPsec Originator and Responder Nodes

As explained above, the IPsec responder node generates the second identifier, such as the responder SPI, during phase 2 of the IKE portion of negotiating the security association (SA) between the IPsec originator and responder nodes. For example, the IPsec responder node can take a hash of the originator SPI and use the resulting value as part of the responder SPI.

Typically, the node that is part of the network separated from the Internet from the NAT device is a client that is trying to communicate with a server, and thus the client is the IPsec originator node and the server is the IPsec responder node. In this situation, the client is the IPsec originator node that originates the data traffic, and the server is the IPsec responder node that responds to the data traffic from the client.

However, sometimes the server, which is not part of the network that is separated from the Internet form the NAT device, may be the node that initiates phase two of IKE. In this situation, the server is the IPsec originator node that is associated with the originator SPI, and the client is the IPsec responder node that generates the responder SPI based on the originator SPI and the specified scheme. However, even if the client is the IPsec responder node, the client typically initiates the data traffic to the server that is the IPsec initiator node.

Because the negotiation of the SA is encrypted, the device employing address translation, such as the NAT device, does not know whether the client is the IPsec originator node or the IPsec responder node. Therefore, the NAT device does not know whether the client's SPI that is stored in the translation table is the originator SPI or the responder SPI.

According to one embodiment, the device employing address translation generates result values based on both the identifier that is stored by the device and the identifier of the received data traffic. Whether or not the client that is part of the network separated from the Internet by the device is the IPsec originator node or IPsec responder node, the device still matches the SPI's as described herein.

For example, if the client is the IPsec originator node because the client initiated phase two of IKE, then the client generates the originator SPI and the NAT device stores the originator SPI in the translation table. When IPsec traffic is received from the server, which is the IPsec responder node, the NAT device checks the responder SPI from the server against a hash of the stored originator SPI to determine if there is a match.

As another example, if the client is the IPsec responder node, because the server initiated phase two of IKE, then the NAT device stores the responder SPI in the translation table when the client sends data traffic. When a response is received from the server, which is the IPsec originator node, the NAT device checks a hash of the originator SPI from the server against the stored responder SPI to determine if there is a match.

Because the NAT device does not know whether the SPI stored in the translation table is the originator SPI or the responder SPI, the NAT device performs a hash on both the stored and received SPI's, and attempts to make a match using either of the hash values. Thus, if the NAT device has stored the originator SPI, the hash of the originator SPI that is stored will match the responder SPI that is received. However, if the NAT device has stored the responder SPI, the hash of the originator SPI that is received will match the stored responder SPI.

III. Matching Identifiers for IPsec Traffic Through a Device Employing Address Translation A. Comparing Initial and Subsequent Identifiers According to one embodiment, a subsequent identifier is compared to a potential initial identifier to determine whether the subsequent identifier matches the potential initial identifier. For example, the initial identifier may be an originator SPI, based upon which a NAT device performs a hash to generate a hash value. The subsequent identifier may be a responder SPI that uses the first two bytes of the hash value, as determined by the IPsec responder node, as the last two bytes of the responder SPI. When the NAT device receives an IPsec based message from the IPsec responder node, the NAT device knows to compare the last two bytes of the responder SPI and to the first two bytes of a hash value that the NAT device has associated with an IPsec originator node to determine a match. When the NAT device determines a match exists, the NAT device knows that the incoming IPsec traffic is directed to the IPsec originator node.

As another example, the NAT device can start with the subsequent identifier and determine the input used by the IPsec responder node to create some or all of the subsequent identifier. For example, if the specified scheme used by the IPsec responder node is to reverse the order of the bytes of the originator SPI to create the responder SPI, the NAT device reverses the order of the responder SPI that is received and compares that result to originator SPI's that the NAT device has previously stored. As a result, the device employing address translation does not use the specified scheme to generate the result value; rather, the device employing address translation uses the specified scheme and the subsequent identifier to determine at least a portion of the input value used by the IPsec responder node and then compares the portion of the input value to potential initial identifiers to locate a match.

B. Handling Multiple IPsec Messages

According to one embodiment, a device employing address translation uses an approach to generate a result value to determine to which IPsec originator node of a group of IPsec originator nodes to direct IPsec based messages from a particular IPsec responder node. Incoming IPsec traffic may be considered to have either a known or unknown destination. The destination is "known" when the device employing address translation has previously determined to which IPsec originator node the particular incoming IPsec based message is directed, such as by using the techniques described herein. The destination is "unknown" when the device employing address translation has not previously determined to which IPsec originator node the particular incoming IPsec base message is directed.

Traffic that is initially unknown and becomes known may yet again become unknown if an IPsec node changes the identifier used with the traffic. For example, a SPI is typically associated with a "lifetime" or "timeout," after the expiration of which a new SPI is generated. Thus, when the SPI used by the IPsec responder node expires and a new SPI is generated, a NAT device again compares the incoming SPI to the result of applying the specified scheme to the originator SPI to determine to which IPsec originator node the IPsec traffic is directed.

Figure 3:
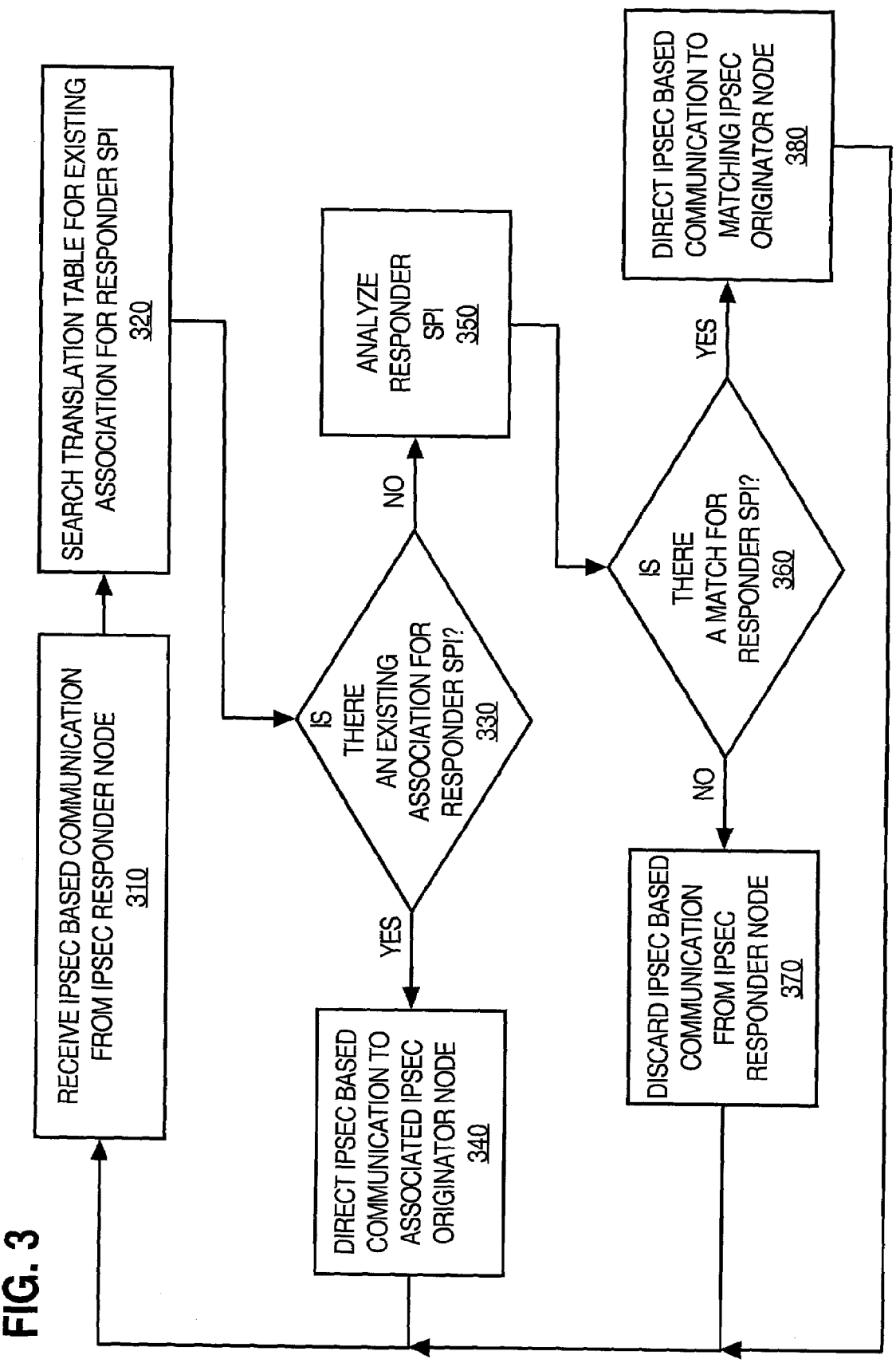
FIG. 3 is a flow diagram of an approach for handling multiple IPsec messages at a device employing address translation, according to an embodiment.

According to one embodiment, IPsec traffic is analyzed to determine whether the destination node is known, and if the destination node is not known, the identifier associated with the IPsec traffic is used to determine to which destination node the traffic should be directed. FIG. 3 is a flow diagram 300 of an approach for handling multiple IPsec messages at a device employing address translation, according to an embodiment. While FIG. 3 is described in terms of IPsec originator nodes and responder nodes using SPI's, any types of nodes using identifiers may be used.

In block 310, a NAT device receives an IPsec based communication. In block 320, the NAT device searches the translation table to determine if there is an existing association between the IPsec responder SPI and an IPsec originator SPI. Existing associations exist from previous IPsec based communications that have been analyzed according to the techniques described herein to determine to which IPsec originator nodes the incoming IPsec traffic is directed.

In block 330, the NAT device determines if an association exists between the IPsec responder SPI and an IPsec originator SPI. For example, the NAT device may search a translation table using the global IP address of the incoming traffic to identify the local IP address of an IPsec originator node. If the association exists, the IPsec traffic is directed to the appropriate local IP address of the associated IPsec originator node in block 340, and the approach returns to block 310. If the association does not exist, the responder SPI is analyzed in block 350, such as by applying the approach of FIG. 2A and FIG. 2B, and the approach continues to block 360.

In block 360, the NAT device determines whether there is a match to the responder SPI. For example, the NAT device may compare the last two bytes of the responder SPI to the first two bytes of the hash values of IPsec originator nodes stored in the translation table.

If a match does not exist, then the IPsec based traffic is discarded in block 370, and the approach returns to block 310. If a match does exist, then the IPsec based traffic is forwarded to the matching IPsec originator node in block 380, and the approach then returns to block 310.

IV. Implementation Features and Other Considerations

A. When and Where to Generate Result Values

According to one embodiment, the device employing address translation generates the result value based on the initial identifier and the hash function, specified scheme, or other approach for generating the result value after the IPsec based message is received from the IPsec originator node. For example, as described above with reference to FIG. 2A and FIG. 2B, the NAT device can perform the hash on the originator SPI as depicted in block 228.

According to one embodiment, the device employing address translation generates a result value based on the initial identifier and the hash function, specified scheme, or other approach for generating the result value after the IPsec based message is received from the IPsec responder node. For example, instead of the NAT device performing the hash on the originator SPI as depicted in block 228 and storing the hash value in the translation table as depicted in block 232, the NAT device can merely store the originator SPI in the translation table. Then after the NAT device receives the IPsec based response message in block 260, the NAT device can perform the hash on the originator SPI that is stored in the translation table before proceeding to the steps depicted in blocks 264 et seq.

According to yet another embodiment, the device employing address translation does not perform the hash function, specified scheme, or other approach for generating a result value based on the initial identifier; rather, the device employing address translation determines a result value based on the subsequent identifier to generate a result that can be used to determine a match with an initial identifier. For example, as described above, if the specified scheme used by the IPsec responder node is to reverse the order of the bytes of the originator SPI to create the responder SPI, the NAT device reverses the order of the responder SPI that is received and compares that result to originator SPI's that the NAT device has previously stored.

According to another embodiment, the IPsec originator node generates a result value based on the initial identifier and the hash function, specified scheme, or other approach for generating the result value and provides the result value to the device employing address translation. For example, an IPsec originator node can use the MD5 one-way hash function with the originator SPI to generate the hash value and then pass the hash value to the NAT device with the IPsec based message.

According to yet another embodiment, a node or device, other than the IPsec originator node or the device employing address translation, applies the hash function, specified scheme, or other approach for generating a result value based on the initial identifier. For example, a dedicated device or another node in an ISP network may be configured to receive the initial identifier, apply the hash function, specified scheme, or other approach to generate the result value and then provide the result value to the NAT device.

B. Storing Identifiers and Result Values

According to one embodiment, initial identifiers for IPsec originator nodes that attempt to establish IPsec based communications with an IPsec responder node are stored by a device employing address translation. According to another embodiment, result values for IPsec originator nodes that attempt to establish IPsec based communications with an IPsec responder node are stored by a device employing address translation. According to yet another embodiment, initial identifiers and result values for IPsec originator nodes that attempt to establish IPsec based communications with an IPsec responder node are stored by a device employing address translation.

Figure 4:
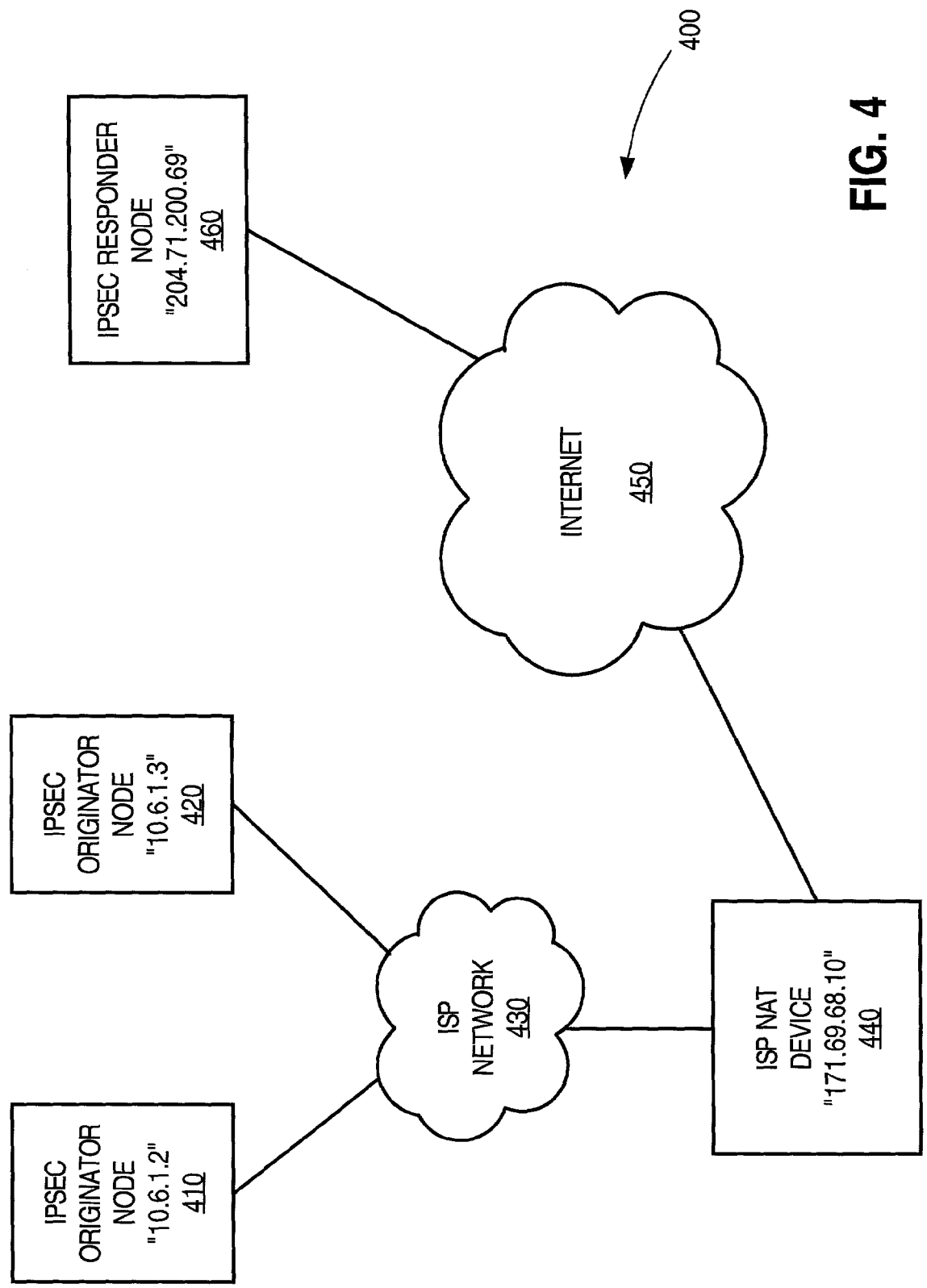
FIG. 4 depicts a logical block diagram with two IPsec originator nodes within a network separated from the Internet by a NAT device, where the two IPsec originators both attempt to establish a IPsec based communications with the same IPsec responder node, according to an embodiment.

For example, FIG. 4 depicts a logical block diagram 400 with two IPsec originator nodes within a network separated from the Internet by a NAT device, where the two IPsec originators both attempt to establish a IPsec based communications with the same IPsec responder node, according to an embodiment. IPsec originator nodes 410, 420 are associated with local IP addresses of "10.6.1.2" and "10.6.1.3," respectively. IPsec originator nodes 410, 420 are communicatively coupled to an ISP network 430, which is communicatively coupled to an ISP NAT device 440 that is associated with global IP address "171.69.68.10," assuming that ISP NAT device 440 employs NAPT. ISP NAT device is communicatively coupled to Internet 450. FIG. 4 also depicts an IPsec responder node 460 that is associated with IP address "204.71.200.69."

Assume for the example depicted in FIG. 4 that both IPsec originator nodes 410, 420 attempt to establish IPsec based communications with IPsec responder node 460 at about the same time so that both IPsec originator nodes 410, 420 are waiting at the same time for corresponding IPsec based response messages from IPsec responder node 460. When IPsec originator node 410 sends an IPsec based message to IPsec responder node 460, ISP NAT device 440 changes the IP address from the inside local IP address of "10.6.1.2" to the inside global IP address of "171.69.68.10." ISP NAT device 440 makes an entry in a translation table to store the association of the inside local IP address and inside global IP address for IPsec originator node 410, along with the outside IP address of IPsec responder node 460. Similarly, ISP NAT device makes an address change and stores an association for IPsec originator node 420.

FIG. 5A and FIG. 5B depict a translation table 500 for ISP NAT device 440 with inside global IP addresses, inside local IP addresses, outside local IP addresses, and outside global IP addresses for IPsec originator nodes 410, 420, according to an embodiment.

In FIG. 5A, translation table 500 includes rows 504, 508 that correspond to IPsec originator nodes 410, 420, respectively, and in FIG. 5B, translation 500 includes rows 504, 506 that correspond to IPsec originator node 410 and rows 508, 510 that correspond to IPsec originator node 420. Translation table 500 includes several columns for each row, including a protocol and node column 514, an inside global IP address column 520, an inside local IP address column 530, an outside local IP address column 540, and an outside global IP address column 550.

Inside global IP address column 520 indicates the global IP address for nodes inside ISP network 430, such as IPsec originator nodes 410, 420 that are provided to nodes outside of ISP network 430. In the example depicted in FIG. 4, the inside global IP addresses for IPsec originator nodes 410, 420 are the IP address for ISP NAT device 440.

Inside local IP address column 530 indicates the local IP address for nodes inside ISP network 430, such as IPsec originator nodes 410, 420, that associated with the IP addresses for IPsec originator nodes 410, 420 in inside global IP address column 520. In the example depicted in FIG. 4, the inside global IP addresses for IPsec originator nodes 410, 420 are their local IP addresses from FIG. 4. In addition, inside local IP address column 530 indicates the SPI for each IPsec originator node with the inside local IP address in FIG. 5A. As depicted in FIG. 5A, the SPI for IPsec originator node 410 is "0xD4560CA1" and the SPI for IPsec originator node 420 is "0xB7285662."

Outside local IP address column 540 indicates the local IP addresses for nodes outside ISP network 430, such as IPsec responder node 460, that communicate with the nodes inside of ISP network 420, such as IPsec originator nodes 410, 420. Outside global IP address column 550 indicates global IP addresses for nodes outside ISP network 430, such as IPsec responder node 460, that communicate with the nodes inside of ISP network 430, such as IPsec originator nodes 410, 420. As depicted in FIG. 5A, the outside local and global IP addresses is the same IP address, namely "204.71.200.69:0" that is associated with IPsec responder node 460.

FIG. 5A depicts translation table 500 after IPsec originator nodes 410, 420 have sent IPsec based messages to IPsec responder node 460, but prior to IPsec based response messages being received and matched to IPsec originator nodes 410, 420. As a result, both outside local IP address column 540 and outside global IP address column 550 include the IP address for IPsec responder node 460 of "204.71.200.69:0" in rows 504, 508 in FIG. 5A.

Assume that in the example depicted in FIG. 4, an incoming IPsec response message, with a destination IP address of "171.69.78.10," from IPsec responder node 460 is received by ISP NAT device 440. Further, assume the following: that the received message has an outside global IP address of "204.71.200.69;" that the received message is associated with a responder SPI of "0xC7CCE73;" and that the responder SPI is just a randomly generated SPI that was conventionally generated by the IPsec responder node 460 during phase two of IKE. Because both IPsec originator nodes 410, 420 are associated with inside global IP address "171.69.68.10" and the responder SPI is randomly generated, ISP NAT device 440 is unable to determine to which IPsec originator node the message is directed.

The example depicted in FIG. 4 and FIG. 5A has ISP NAT device 440 performing a hash on the originator SPI's when IPsec based response messages are received, and therefore no hash values are stored in translation table 500 in FIG. 5A. However, other approaches may be used. For example, ISP NAT device 440 can be configured to perform the hash on the originator SPI's as IPsec traffic is sent from ISP network 430, and the hash values can be stored with the inside global IP addresses in inside global IP address column 520, such as by appending the hash values to the IP addresses as in inside local IP address column 530.

C. Storing Matching Identifiers

According to one embodiment, subsequent identifiers from an IPsec responder node for IPsec based communications with IPsec originator nodes are mapped to initial identifiers for IPsec originator nodes, and the mappings are stored by a device employing address translation. For example, with respect to FIG. 4, now assume that IPsec responder node 460 has generated the SPI for each IPsec based response message by using the first four bytes of an MD5 has of the originator SPI during phase two of IKE. Thus, for IPsec originator nodes 410, 420, IPsec responder node 460 uses SPI's of "0xB3511368" and "0xC3ADA079," respectively, when sending IPsec based response messages. Also, assume that ISP NAT device 440 performs the MD5 hash of the originator SPI's when an IPsec based response message is received.

When an IPsec based response message is received with the destination IP address of "171.69.68.10" and an associated responder SPI of "0xC3ADA079," ISP NAT device 440 performs an MD5 hash on the unmatched SPI's in inside local IP address column 530, and then compares the responder SPI to the hash value for each originator SPI. For this particular IPsec based response message, ISP NAT device determines that responder SPI matches the originator SPI for IPsec originator node 420 that is stored in row 508 in inside local IP address column 530. As a result, ISP NAT device 440 adds row 510 for IPsec originator node 420 to translation table 500, as depicted in FIG. 5B. Row 510 associates the responder SPI "0xC3ADA079" that is stored in outside global IP address column 550 with the inside local address "10.6.1.3:0" for IPsec originator node 420 that is stored in inside local IP address column 520. Similarly, when an IPsec based response message is received with the destination IP address of "171.69.68.10" and an associated responder SPI of "0xB3511368," ISP NAT device 440 matches the response message to IPsec originator node 410 and updates translation table 500 by adding row 506, as depicted in FIG. 5B.

The example depicted in FIG. 4, FIG. 5A, and FIG. 5B has ISP NAT device 440 performing a hash on the originator SPI's when IPsec based response messages are received, and therefore no hash values are stored in translation table 500 in FIG. 5A. However, other approaches may be used. For example, ISP NAT device 440 can be configured to perform the hash on the originator SPI's as IPsec traffic is sent from ISP network 430, and the hash values can be stored with the inside global IP addresses in inside global IP address column 520 in a manner similar to the appending of the SPI's to the IP addresses as in inside local IP address column 530. Then as IPsec based response messages are received, ISP NAT device 440 compares the responder SPI to the hash values stored in inside global IP address column 520.

D. Collisions vs. Random Bytes of the Subsequent Identifier

A "collision" occurs when the device employing address translation cannot distinguish between two originator nodes when trying to determine to which originator node IPsec traffic is directed. For example, if the IPsec responder node generates the responder SPI by taking the first byte of an MD5 hash of the originator SPI and using that first byte as the last byte of the responder SPI, then it is possible for two originator SPI's that the last byte of their hashes are the same. As a result, when the NAT device receives an IPsec based response message, the NAT device is unable to determine to which IPsec originator node the IPsec response message is directed.

The risk of collisions can be lessened by using a larger portion of the result value for the responder SPI. For example, the entire responder SPI can be based on the first four bytes of an MD5 hash of the originator SPI. However, in such a situation, the responder SPI is entirely dependent on the originator SPI and cannot be changed. In some situations or implementations, it may be desirable to have at least a portion of the responder SPI based on at least some random bytes or other specified bytes besides those based on the result value. For example, the responder SPI may consist of two bytes of a conventionally determined SPI and two bytes from the result value based on the originator SPI.

The risk of collisions is present only when the IPsec based communications are being established and prior to the matching of the IPsec response messages to the appropriate IPsec originator node. Once the IPsec response message are matched, then the device employing address translation knows how to direct the response messages based on the mapping of the SPI's between the IPsec originator and responder nodes. For example, referring back to FIG. 3, it is only when the answer to block 330 is "NO", meaning that there is no existing association for the responder SPI, that there is risk of a collision when the answer to block 330 is "YES," a previously stored association is used to direct the IPsec traffic.

Furthermore, the risk of collisions can be lessened by using randomly generated originator SPI's, such that the result values based on the randomly generated originator SPI's are less likely to be the same.

VI. Hardware Overview

The approach for facilitating IPsec communications through devices that employ address translation in a telecommunications network described herein may be implemented in a variety of ways and the invention is not limited to any particular implementation. The approach may be integrated into a computer system or a router, or may be implemented as a stand-alone mechanism. Furthermore, the approach may be implemented in computer software, hardware, or a combination thereof.

Figure 6:
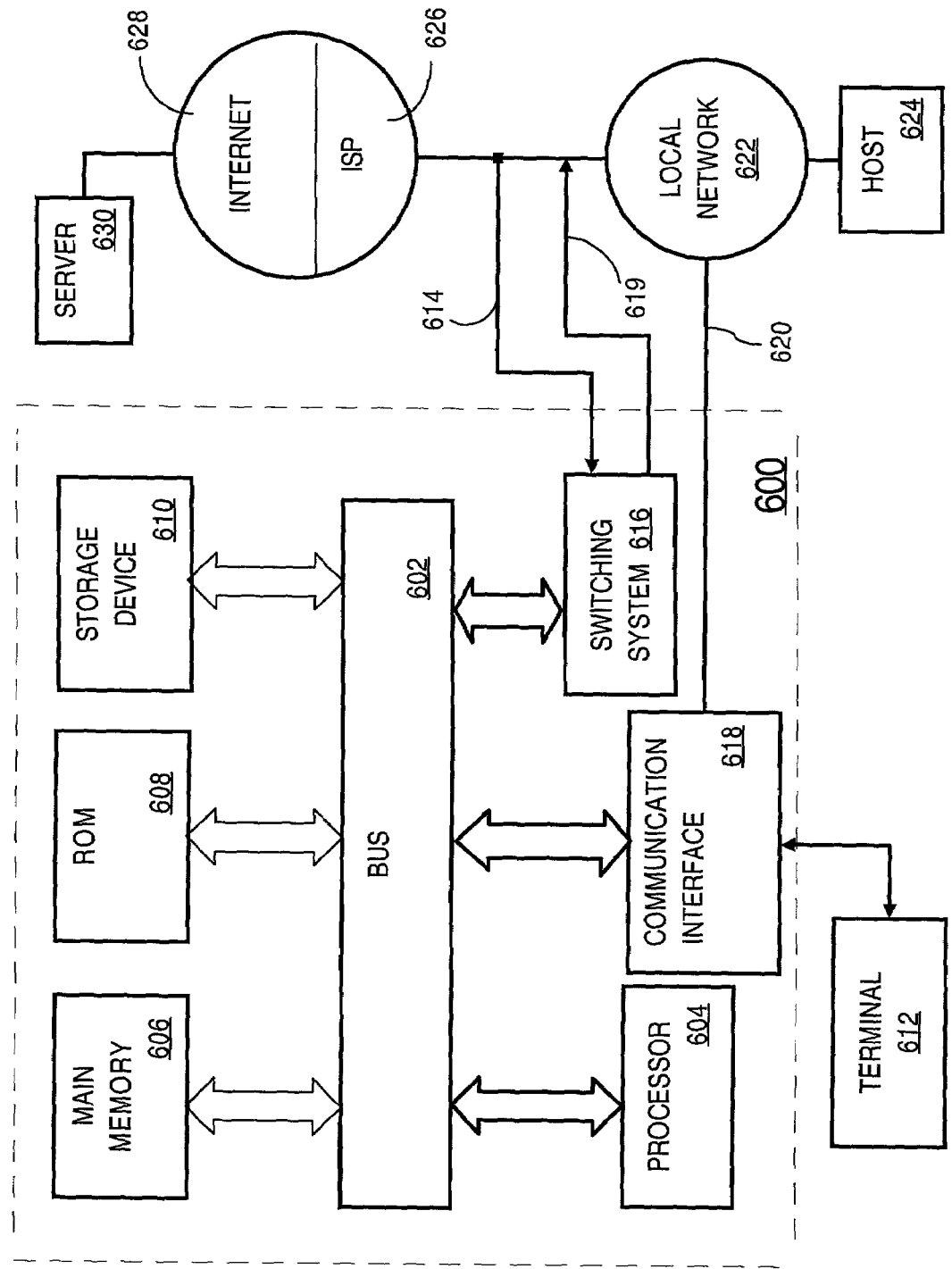
FIG. 6 is a block diagram that depicts a computer system upon which embodiments of the invention may be implemented.

FIG. 6 is a block diagram that depicts a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Communication interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for facilitating IPsec communications through devices that employ address translation in a telecommunications network. According to one embodiment of the invention, processes for facilitating IPsec communications through devices that employ address translation in a telecommunications network are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for facilitating IPsec communications through devices that employ address translation in a telecommunications network as described herein.

The received code may be executed by processor 604 as it is received, and/or stored in storage device 610, or other non-volatile storage for later execution. In this manner, computer system 600 may obtain application code in the form of a carrier wave.

VII. Extensions and Alternatives

In the foregoing specification, the invention has been described with reference to specific embodiments thereof. It will, however, be evident that various modifications and changes may be made thereto without departing from the broader spirit and scope of the invention. For example, although examples have illustrated the use of NAT devices, the NAT devices are used for explanation purposes only as embodiments of the invention are not limited to any particular type of device employing address translation. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for facilitating Internet security protocol (IPsec) based communications through a device that employs address translation in a telecommunications network, the method comprising the steps of:

receiving a first electronic message from a first node, wherein:

the first node is associated with a first network address;

the first electronic message is based on IPsec;
the first electronic message is associated with a first identifier;
the first identifier is a first IPsec Security Parameter Index (SPI);
the first identifier is generated by the first node; and
the first electronic message is addressed to a second network address;
the device generating a value based on the first identifier and a specified scheme,
wherein the specified scheme is a computer-implemented operation that is known to both the device that employs address translation and a second node;
sending the first electronic message to the second node based on the second network address, wherein the first electronic message includes a particular network address that is associated with the device instead of the first network address;
receiving a second electronic message from the second node, wherein:
the second electronic message is based on IPsec;
the second electronic message is addressed to the particular network address;
the second electronic message is associated with a second identifier that is different than the first identifier;
the second identifier is a second IPsec SPI; and
the second identifier is generated, based on the first identifier and the specified scheme, by the second node;
the device determining whether the second electronic message is directed to the first node based on the value and the second identifier; and
sending the second electronic message to the first node at the first network address when the second electronic message is determined to be directed to the first node.

2. A method as recited in claim 1, further comprising the steps of:
receiving a third electronic message from a third node, wherein:
the third node is associated with a third network address;
the third electronic message is based on IPsec;
the third electronic message is associated with a third identifier;
the third identifier is a third IPsec SPI; and
the third identifier is generated by the third node; and
the third electronic message is addressed to the second network address;
the device generating an additional value based on the third identifier and the specified scheme;
sending the third electronic message to the second node based on the second network address, wherein the first electronic message includes the particular network address that is associated with the device instead of the third network address;
receiving, after sending the first electronic message and the third electronic message to the second node, the second electronic message from the second node;
wherein:
the second electronic message is based on IPsec;
the second electronic message is addressed to the third network address;
the second electronic message is associated with the second identifier that is different than the first identifier and the third identifier; and
the second identifier is generated, based on the third identifier and the specified scheme, by the second node;
the device determining whether the second electronic message is directed to the third node based on the additional value and the second identifier; and
when the second electronic message is determined to be directed to the third node, sending the second electronic message to the third node at the third network address.

3. A method as recited in claim 1, wherein the specified scheme is selected from the group consisting of a first scheme that produces a fixed length output, a second scheme that includes a hash algorithm, and a third scheme that includes a Message Digest 5 one-way hash function.

4. A method as recited in claim 1, wherein:
the value is a hash value;
the second identifier is based at least in part on the hash value;
the hash value is comprised of a first plurality of bytes;
the second identifier is comprised of a second plurality of bytes;
a last pair of bytes of the second plurality of bytes is a first pair of bytes of the first plurality of bytes; and
the step of determining whether the second electronic message is directed to the first node further comprises the steps of:
comparing the last pair of bytes of the second identifier to the first pair of bytes of the hash value; and
when the last pair of bytes of the second identifier match the first pair of bytes of the hash value, determining that the second electronic message is directed to the first node.

5. A method as recited in claim 1, wherein:
the first node is an IPsec originator node;
the second node is an IPsec responder node;
the device employs a feature selected from the group consisting of network address translation (NAT), dynamic address NAT, and network address port translation (NAPT);
and the method further comprises the steps of:
creating and storing a mapping between the value and the first IPsec SPI;
creating an association between the value and the first IPsec SPI; and
storing the association in a translation table.

6. A method as recited in claim 1, wherein the first electronic message and the second electronic message are both based on an IPsec feature selected from the group consisting of IPsec tunnel mode and IPsec Encapsulation Security Payload.

7. A method as recited in claim 1, further comprising the steps of:
when the second electronic message is determined to be directed to the first node, creating an association between the first network address and the second identifier;
storing the association in a table;
receiving a third electronic message from the second node, wherein the third electronic message is based on IPsec and is associated with the second identifier; and
determining that the third electronic message is directed to the first node based on the association.

8. A method as recited in claim 1, further comprising the steps of:
receiving a third electronic from the second node, wherein:
the third electronic message is based on IPsec;

the third electronic message is addressed to the specified network address;

the third electronic message is associated with a third identifier that is different than both the first identifier and the second identifier;

the third identifier is a third IPsec SPI; and the third identifier is generated, based on the first identifier and the specified scheme, by the second node;

the device determining whether the third electronic message is directed to the first node based on the value and the third identifier; and when the third electronic message is determined to be directed to the first node, sending the third electronic message to the first node at the first network address.

9. A method as recited in claim 1, wherein the step of the device generating the value is performed before the step of receiving the second electronic message.

10. A method as recited in claim 1, wherein the step of the device generating the value is performed after the step of receiving the second electronic message.

11. A method for facilitating Internet security protocol (IPsec) based communications through a device that employs address translation in a telecommunications network, the method comprising the steps of:

receiving a first electronic message from a first node, wherein:
the first node is associated with a first network address;
the first electronic message is based on IPsec;
the first electronic message is associated with a first identifier;
the first identifier is a first IPsec Security Parameter Index (SPI);
the first identifier is generated by the first node based on a second identifier and a specified scheme;
the specified scheme is a computer-implemented operation that is known to both the device that employs address translation and the first node;
the second identifier is a second IPsec SPI;
the first identifier is different than the second identifier; and
the first electronic message is addressed to a second network address;

sending the first electronic message to a second node based on the second network address, wherein the first electronic message includes a particular network address that is associated with the device instead of the first network address;

receiving a second electronic message from the second node, wherein:
the second electronic message is based on IPsec;
the second electronic message is address to the particular network address;
the second electronic message is associated with the second identifier; and
the second identifier is generated by the second node;

the device generating a value based on the second identifier and the specified scheme;

the device determining whether the second electronic message is directed to the first node based on the value and the first identifier; and sending the second electronic message to the first node at the first network address when the second electronic message is determined to be directed to the first node.

12. An apparatus for facilitating Internet security protocol (IPsec) based communications with a device that employs address translation in a telecommunications network, the apparatus comprising:

a processor; and one or more stored sequences of instructions which, when executed by the processor, cause the processor to carry out the steps of:

generating a value based on both a first identifier that is associated with a first node and a specified scheme, wherein:
the first identifier is generated by the first node;
the first identifier is a first IPsec Security Parameter Index (SPI); and
the specified scheme is a computer-implemented operation that is known to both the device that employs address translation and the first node;

the apparatus generating a second identifier based on the value, wherein the second identifier is a second IPsec SPI;

receiving, from the device that employs address translation, a first electronic message that originates from the first node, wherein:
the first electronic message is based on IPsec;
the first electronic message is associated with the first identifier;
the first electronic message includes a particular network address that is associated with the apparatus instead of a first network address that is associated with the first node; and
the first electronic message is addressed to a second network address that is associated with the second node;

in response to receiving the first electronic message, generating a second electronic message to the first node, wherein:
the second electronic message is based on IPsec;
the second electronic message is associated with the second identifier; and the second electronic message is addressed to the particular network address;

sending the second electronic message to the device that employs address translation at the particular network address;

wherein the device determines whether the second electronic message is directed to the first node based on the second identifier and the value that is generated by the device based on the first identifier and the specified scheme; and wherein the device sends the second electronic message to the first node at the first network address when the device determines that the second electronic message is directed to the first node.

13. An apparatus as recited in claim 12, wherein the value is a hash value, and the instructions for generating the second IPsec SPI further comprises one or more stored sequences of instructions which, when executed by the processor, cause the process to carry out the step of generating, prior to receiving the first electronic message, the second IPsec SPI based on the hash value.

14. An apparatus as recited in claim 12, wherein the value is a hash value, the first IPsec SPI is a first randomly generated fixed length value and the instructions for generating the second IPsec SPI further comprises one or more stored sequences of instructions which, when executed by the processor, cause the process to carry out the step of generating the second IPsec SPI based on at least a first portion of the hash value and a second portion of a second randomly generated fixed length value.

15. An apparatus for facilitating Internet security protocol (IPsec) based communications through a router that employs network address translation in a telecommunications network, the apparatus comprising:
   a processor; and
   one or more stored sequences of instructions which, when executed by the processor, cause the processor to carry out the steps of:
   receiving a first electronic message from a first IPsec originator node, wherein:
      the first IPsec originator node is associated with a first network address;
      the first electronic message is secured using IPsec:
      the first electronic message is associated with a first security parameter index (SPI);
      the first SPI is generated by the first IPsec originator node; and
      the first electronic message is addressed to a third network address;
   the router generating a first hash value based on the first SPI and a hash algorithm;
   sending the first electronic message to an IPsec responder node based on the third network address, wherein the first electronic message includes a particular network address that is associated with the router instead of the first network address;
   receiving a second electronic message from a second IPsec originator node, wherein:
      the second IPsec originator node is associated with a second network address;
      the second electronic message is secured using IPsec;
      the second electronic message is associated with a second SPI;
      the second SPI is generated by the second IPsec originator node; and
      the second electronic message is address to the third network address;
   the router generating a second hash value based on the second SPI and the hash algorithm;
   sending the second electronic message to the IPsec responder node based on the third network address, wherein the second electronic message includes the particular network address that is associated with the router instead of the second network address;
   after sending the first electronic message and the second electronic message to the IPsec responder node, receiving a third electronic message from the IPsec responder node, wherein:
      the third electronic message is secured using IPsec;
      the third electronic message is associated with a third SPI that is different than the first SPI and the second SPI;
      the third electronic message is addressed to the particular network address;
      the third SPI is generated by the IPsec responder node based at least in part on the hash algorithm;
   the router determining whether the third electronic message is directed to the first IPsec originator node based on the first hash value and the third SPI;
   when the third electronic message is determined to be directed to the first IPsec originator node, sending the third electronic message to the first IPsec originator node at the first network address;
   determining whether the third electronic message is directed to the second IPsec originator node based on the second hash value and the third SPI; and
   when the third electronic message is determined to be directed to the second IPsec originator node, sending the third electronic message to the second IPsec originator node at the second network address.

16. An apparatus as recited in claim 15, wherein the first electronic message is based on IPsec tunnel mode and IPsec Encapsulating Security Payload (ESP), the second electronic message is based on IPsec tunnel mode and IPsec ESP, and the hash algorithm is a Message Digest 5 one-way hash function.

17. A computer-readable medium storing one or more sequences of instructions therein for facilitating Internet security protocol (IPsec) based communications through a device that employs address translation in a telecommunications network, which instructions, when executed by one or more processors, cause the one or more processors to carry out the steps of:
   receiving a first electronic message from a first node, wherein:
      the first node is associated with a first address;
      the first electronic message is based on IPsec;
      the first electronic message is associated with a first identifier;
      the first identifier is a first IPsec Security Parameter Index (SPI);
      the first identifier is generated by the first node; and
      the first electronic message is addressed to a second network address;
   the device generating a value based on the first identifier and a specified schemes wherein the specified scheme is a computer-implemented operation that is known to both the device that employs address translation and a second node;
   sending the first electronic message to the second node based on the second network address, wherein the first electronic message includes a particular network address that is associated with the device instead of the first network address;
   receiving a second electronic message from the second node, wherein:
      the second electronic message is based on IPsec;
      the second electronic message is addressed to the particular network address;
      the second electronic message is associated with a second identifier that is different than the first identifiers the second identifier is a second IPsec SPI; and
      the second identifier is generated, based on the first identifier and the specified scheme, by the second node;
   the device determining whether the second electronic message is directed to the first node based on the value and the second identifier; and
   sending the second electronic message to the first node at the first network address when the second electronic message is determined to be directed to the first node.

18. An apparatus for facilitating Internet security protocol (IPsec) based communications while employing address translation in a telecommunications network, comprising:
   a processor; and
   one or more stored sequences of instructions which, when executed by the processor, cause the processor to carry out the steps of:
   receiving a first electronic message from a first node, wherein:

the first node is associated with a first network address;
the first electronic message is based on IPsec;
the first electronic message is associated with a first identifier the first identifier is a first IPsec Security Parameter Index (SPI);
the first identifier is generated by the first node based on a second identifier and a specified scheme;
the specified scheme is a computer-implemented operation that is known to both the device that employs address translation and the first node;
the second identifier is a second IPsec SPI;
the first identifier is different than the second identifier; and
the first electronic message is addressed to a second network address;
sending the first electronic message to a second node based on the second network address, wherein the first electronic message includes a particular network address that is associated with the apparatus instead of the first network address;
receiving a second electronic message from the second node, wherein:
the second electronic message is based on IPsec;
the second electronic message is address to the particular network address;
the second electronic message is associated with the second identifier; and
the second identifier is generated by the second node;
generating a value based on the second identifier and the specified scheme;
determining whether the second electronic message is directed to the first node based on the value and the first identifier; and
sending the second electronic message to the first node at the first network address when the second electronic message is determined to be directed to the first node.

19. An apparatus for facilitating Internet security protocol (IPsec) based communications while employing address translation in a telecommunications network, the apparatus comprising:
means for receiving a first electronic message from a first node, wherein:
the first node is associated with a first network address;
the first electronic message is based on IPsec;
the first electronic message is associated with a first identifier;
the first identifier is a first IPsec Security Parameter Index (SPI);
the first identifier is generated by the first node; and
the first electronic message is addressed to a second network address;
means for generating a value based on the first identifier and a specified scheme, wherein the specified scheme is a computer-implemented operation that is known to both the device that employs address translation and a second node;
means for sending the first electronic message to the second node based on the second network address, wherein the first electronic message includes a particular network address that is associated with the apparatus instead of the first network address;
means for receiving a second electronic message from the second node, wherein:
the second electronic message is based on IPsec;
the second electronic message is addressed to the particular network address;
the second electronic message is associated with a second identifier that is different than the first identifier;
the second identifier is a second IPsec SPI; and
the second identifier is generated, based on the first identifier and the specified scheme, by the second node;
means for determining whether the second electronic message is directed to the first node based on the value and the second identifier; and
means for sending the second electronic message to the first node at the first network address when the second electronic message is determined to be directed to the first node.

20. An apparatus as recited in claim 19, further comprising:
means for receiving a third electronic message from a third node, wherein:
the third node is associated with a third network address;
the third electronic message is based on IPsec;
the third electronic message is associated with a third identifier;
the third identifier is a third IPsec SPI; and
the third identifier is generated by the third node; and
the third electronic message is addressed to the second network address;
means for generating an additional value based on the third identifier and the specified scheme;
means for sending the third electronic message to the second node based on the second network address, wherein the first electronic message includes the particular network address that is associated with the apparatus instead of the third network address;
means for receiving, after sending the first electronic message and the third electronic message to the second node, the second electronic message from the second node;
wherein:
the second electronic message is based on IPsec;
the second electronic message is addressed to the third network address;
the second electronic message is associated with the second identifier that is different than the first identifier and the third identifier; and
the second identifier is generated, based on the third identifier and the specified scheme, by the second node;
means for determining whether the second electronic message is directed to the third node based on the additional value and the second identifier; and
means for sending the second electronic message to the third node at the third network address, when the second electronic message is determined to be directed to the third node.

21. An apparatus as recited in claim 19, wherein the specified scheme is selected from the group consisting of a first scheme that produces a fixed length output, a second scheme that includes a hash algorithm, and a third scheme that includes a Message Digest 5 one-way hash function.

22. An apparatus as recited in claim 19, wherein:
the value is a hash value;
the second identifier is based at least in part on the hash value;
the hash value is comprised of a first plurality of bytes;
the second identifier is comprised of a second plurality of bytes;

a last pair of bytes of the second plurality of bytes is a first pair of bytes of the first plurality of bytes; and the means for determining whether the second electronic message is directed to the first node further comprises:

means for comparing the last pair of bytes of the second identifier to the first pair of bytes of the hash value; and means for determining that the second electronic message is directed to the first node, when the last pair of bytes of the second identifier match the firs pair of bytes of the hash value.

23. An apparatus as recited in claim 19, wherein:

the first node is an IPsec originator node;

the second node is an IPsec responder node;

the apparatus employs a feature selected from the group consisting of network address translation (NAT), dynamic address NAT, and network address port translation (NAPT);

and the apparatus further comprises:

means for creating and storing a mapping between the value and the first IPsec;

means for creating an association between the value and the first IPsec SPI; and means for storing the association in a translation table.

24. An apparatus as recited in claim 19, wherein the first electronic message and the second electronic message are both based on an IPsec feature selected from the group consisting of IPsec tunnel mode and IPsec Encapsulation Security Payload.

25. An apparatus as recited in claim 19, further comprising:

means for creating an association between the first network address and the second identifier, when the second electronic message is determined to be directed to the first node;

means for storing the association in a table;

means for receiving a third electronic message from the second node, wherein the third electronic message is based on IPsec and is associated with the second identifier; and means for determining that the third electronic message is directed to the first node based on the association.

26. An apparatus as recited in claim 19, further comprising:

means for receiving a third electronic from the second node, wherein:

the third electronic message is based on IPsec;

the third electronic message is addressed to the specified network address;

the third electronic message is associated with a third identifier that is different than both the first identifier and the second identifier;

the third identifier is a third IPsec SPI: and the third identifier is generated, based on the first identifier and the specified scheme, by the second node;

means for determining whether the third electronic message is directed to the first node based on the value and the third identifier; and means for sending the third electronic message to the first node at the first network address, when the third electronic message is determined to be directed to the first node.

27. An apparatus as recited in claim 19, wherein the value is generated before the second electronic message is received.

28. An apparatus as recited in claim 19, wherein the value is generated after the second electronic message is received.

29. An apparatus for facilitating Internet security protocol (IPsec) based communications while employing address translation in a telecommunications network, comprising:

a processor; and one or more stored sequences of instructions which, when executed by the processor, cause the processor to carry out the steps of:

receiving a first electronic message from a first node, wherein:

the first node is associated with a first network address;

the first electronic message is based on IPsec;

the first electronic message is associated with a first identifier;

the first identifier is generated by the first node; and the first electronic message is addressed to a second network address;

generating a value based on the first identifier and a specified scheme, wherein the specified scheme is a computer-implemented operation that is known to both the device that employs address translation and a second node;

sending the first electronic message to the second node based on the second network address, wherein the first electronic message includes a particular network address that is associated with the apparatus instead of the first network address;

receiving a second electronic message from the second node, wherein:

the second electronic message is based on IPsec;

the second electronic message is addressed to the particular network address;

the second electronic message is associated with a second identifier that is different than the first identifier;

the second identifier is a second IPsec SPI;

the second identifier is generated, based on the first identifier and the specified scheme, by the second node;

determining whether the second electronic message is directed to the first node based on the value and the second identifier; and sending the second electronic message to the first node at the first network address when the second electronic message is determined to be directed to the first node.

30. An apparatus as recited in claim 29, further comprising one or more stored instructions which, when executed by the processor, cause the processor to carry out the steps of:

receiving a third electronic message from a third node, wherein:

the third node is associated with a third network address;

the third electronic message is based on IPsec;

the third electronic message is associated with a third identifier;

the third identifier is a third IPsec SPI; and the third identifier is generated by the third node; and the third electronic message is addressed to the second network address;

generating an additional value based on the third identifier and the specified scheme;

sending the third electronic message to the second node based on the second network address, wherein the first electronic message includes the particular network address that is associated with the apparatus instead of the third network address;

receiving, after sending the first electronic message and the third electronic message to the second node, the second electronic message from the second node;

wherein:

the second electronic message is based on IPsec;

the second electronic message is addressed to the third network address;

the second electronic message is associated with the second identifier that is different than the first identifier and the third identifier; and the second identifier is generated, based on the third identifier and the specified scheme, by the second node;

determining whether the second electronic message is directed to the third node based on the additional value and the second identifier; and when the second electronic message is determined to be directed to the third node, sending the second electronic message to the third node at the third network address.

31. An apparatus as recited in claim 29, wherein the specified scheme is selected from the group consisting of a first scheme that produces a fixed length output, a second scheme that includes a hash algorithm, and a third scheme that includes a Message Digest 5 one-way hash function.

32. An apparatus as recited in claim 29, wherein:

the value is a hash value;

the second identifier is based at least in part on the hash value;

the hash value is comprised of a first plurality of bytes;

the second identifier is comprised of a second plurality of bytes;

a last pair of bytes of the second plurality of bytes is a first pair of bytes of the first plurality of bytes; and the instructions for determining whether the second electronic message is directed to the first node further comprises one or more stored instructions which, when executed by the processor, cause the processor to carry out the steps of:

comparing the last pair of bytes of the second identifier to the first pair of bytes of the hash value; and when the last pair of bytes of the second identifier match the firs pair of bytes of the hash value, determining that the second electronic message is directed to the first node.

33. An apparatus as recited in claim 29, wherein:

the first node is an IPsec originator node;

the second node is an IPsec responder node;

the apparatus employs a feature selected from the group consisting of network address translation (NAT), dynamic address NAT, and network address port translation (NAPT);

and the apparatus further comprises one or more stored instructions which, when executed by the processor, cause the processor to carry out the steps of:

creating and storing a mapping between the value and the first IPsec SPI;

creating an association between the value and the first IPsec SPI identifier; and storing the association in a translation table.

34. An apparatus as recited in claim 29, wherein the first electronic message and the second electronic message are both based on an IPsec feature selected from the group consisting of IPsec tunnel mode and IPsec Encapsulation Security Payload.

35. An apparatus as recited in claim 29, further comprising one or more stored instructions which, when executed by the processor, cause the processor to carry out the steps of:

when the second electronic message is determined to be directed to the first node, creating an association between the first network address and the second identifier;

storing the association in a table;

receiving a third electronic message from the second node, wherein the third electronic message is based on IPsec and is associated with the second identifier; and determining that the third electronic message is directed to the first node based on the association.

36. An apparatus as recited in claim 29, further comprising one or more stored instructions which, when executed by the processor, cause the processor to carry out the steps of:

receiving a third electronic from the second node, wherein:

the third electronic message is based on IPsec;

the third electronic message is addressed to the specified network address;

the third electronic message is associated with a third identifier that is different than both the first identifier and the second identifier;

the third identifier is a third IPsec SPI; and the third identifier is generated, based on the first identifier and the specified scheme, by the second node;

determining whether the third electronic message is directed to the first node based on the value and the third identifier; and when the third electronic message is determined to be directed to the first node, sending the third electronic message to the first node at the first network address.

37. An apparatus as recited in claim 29, wherein the value is generated before the second electronic message is received.

38. An apparatus as recited in claim 29, wherein the value is generated after the second electronic message is received.

* * * * *

UNITED STATES PATENT AND TRADEMARK OFFICE
CERTIFICATE OF CORRECTION

PATENT NO. : 7,181,612 B1 Page 1 of 1
APPLICATION NO. : 10/052279
DATED : February 20, 2007
INVENTOR(S) : Chinna N. R. Pellacuru and Adina F. Simu It is certified that error appears in the above-identified patent and that said Letters Patent is hereby corrected as shown below:

In the claims:

Claim 17, Column 26, line 20, replace "schemes" with --scheme,--

Claim 17, Column 26, line 36, replace "tifiers" with --tifier;--

Claim 22, Column 29, line 10, replace "firs" with --first--

Claim 23, Column 29, line 10, after "IPsec" insert --SPI--

Claim 26, Column 29, line 11, replace ":" with --;--

Claim 29, Column 30, line 35, after "SPI;" insert --and--

Claim 32, Column 31, line 18, replace "firs" with --first--

Claim 33, Column 32, line 4, delete "identifier"

Signed and Sealed this

Twelfth Day of June, 2007

JON W. DUDAS
*Director of the United States Patent and Trademark Office*